May 5, 1970            R. P. WOLGAST            3,510,623
PORTABLE RESISTANCE SPOT WELDER
Original Filed Jan. 25, 1965            2 Sheets-Sheet 2
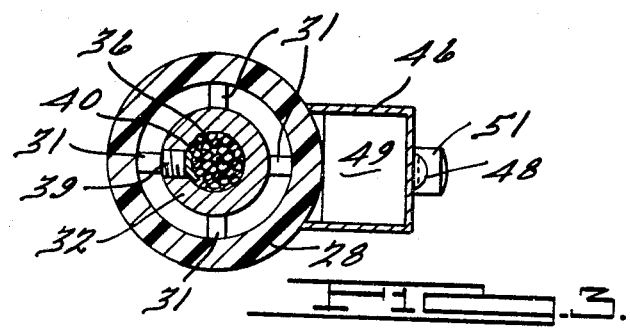
INVENTOR.
Raymond P. Wolgast
BY
Barnes, Kisbey & Pierce
ATTORNEYS.

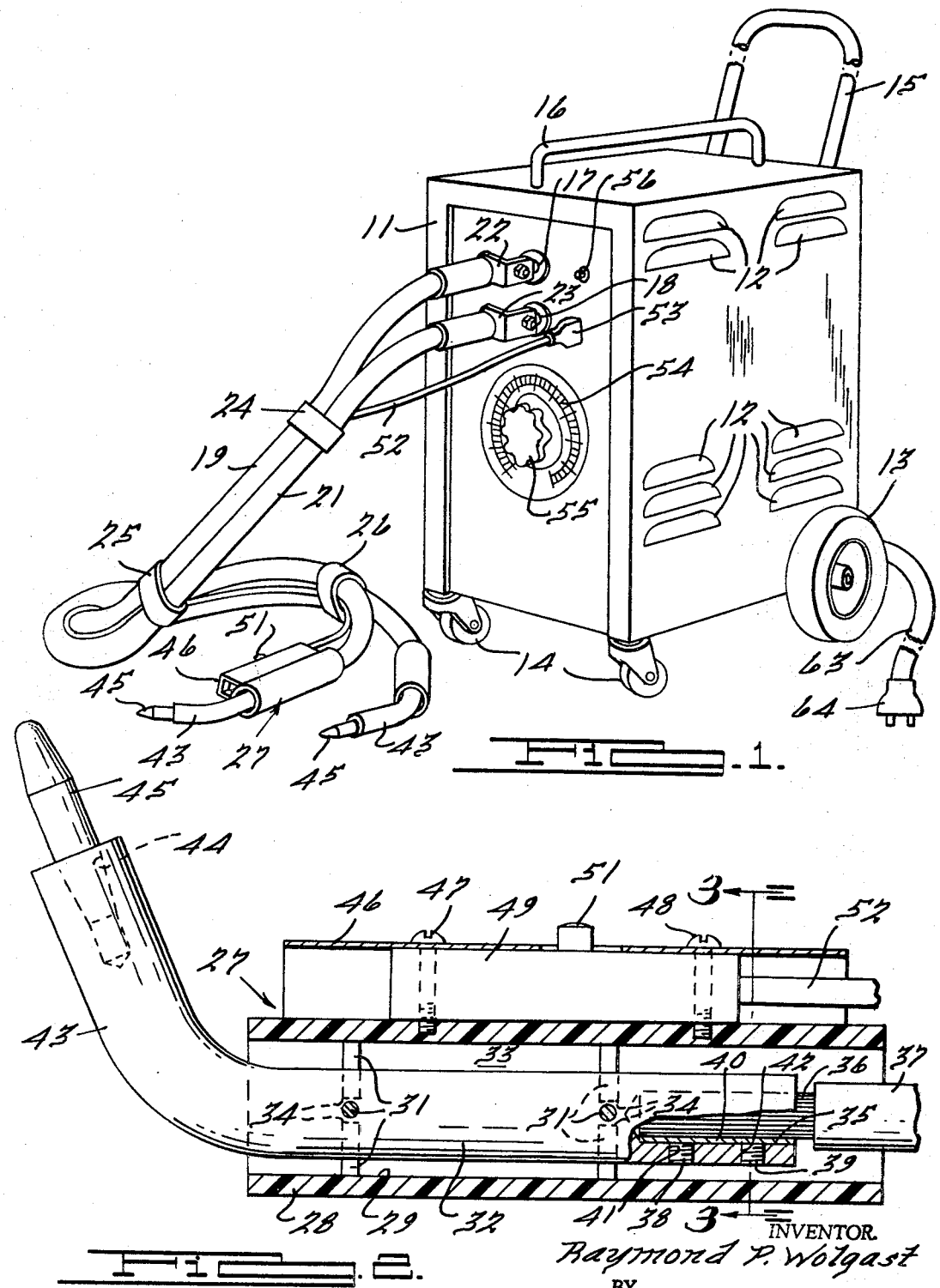

United States Patent Office 3,510,623  
Patented May 5, 1970

3,510,623  
PORTABLE RESISTANCE SPOT WELDER  
Raymond P. Wolgast, 3726 Kipling Road,  
Berkeley, Mich. 48072  
Original application Jan. 25, 1965, Ser. No. 427,679, now Patent No. 3,397,322, dated Aug. 13, 1969. Divided and this application Apr. 22, 1968, Ser. No. 723,209  
Int. Cl. B23k 9/28  
U.S. Cl. 219—86   9 Claims

ABSTRACT OF THE DISCLOSURE

A portable resistance spot welding machine embodying a lightweight electrode holder that reduces the transmission of heat to an operator's hands. The holder defines a longitudinally extending cavity into which the electrode extends. Insulating elements extend between the cavity of the holder and the electrode for holding the electrode in spaced relationship within the cavity for circulating airflow.

Background of the invention

The invention relates to a portable resistance spot welding machine and more particularly to an improved electrode holder for such a machine and this application is a division of my copending application of the same title, Ser. No. 427,679, filed Jan. 25, 1965, now issued as U.S. Letters Pat. 3,397,322.

It has been proposed to provide a portable spot welding machine in which the welding transformer and control mechanism is contained within a portable housing that may be moved from position to position. This type of mechanism has application in uses where production line facilities employing large equipment are not practical. A portable welding apparatus has particular application in automotive body shops and metal working shops wherein spot welding is a desirable fabricating technique, but previous equipment has not been sufficiently flexible to permit its use for all spot welding applications.

It, therefore, is a principal object of this invention to provide an improved portable resistance spot welding machine that is sufficiently flexible to make all types of spot welds.

In the most conventional type of spot welding apparatus, a pair of electrodes are brought into engagement with opposite surfaces of the members to be welded. Because of the pressure exerted upon the members through the electrodes, this method of spot welding is called a "pinch gun" technique. Pinch gun spot welding is most commonly associated with production line welding machines wherein a great number of identical welds are made by a single machine. There are many instances, however, where the pinch type welding technique cannot be employed.

Automotive body repair shops and small sheet metal shops are typical examples of applications wherein the pinch type welding apparatus may not be practical. These shops normally are not called upon to make a great number of identical welds. The physical location of the area to be welded also dictates against the use of the pinch weld technique. Although in some instances the locations of the weld will permit the pinch technique, another method of spot welding called the indirect method frequently must be used. The indirect welding method has particular application where the parts to be welded are so positioned as to make it impossible or impractical for opposite sides to be engaged by the electrodes. In the indirect welding method, the electrodes are both positioned on the same side of the parts to be welded but at spaced locations.

The welding time required to complete the indirect type of spot weld is considerably greater than the time required to make a direct, pinch type weld. If the indirect weld is to be made with a portable machine, effective heat insulation must be provided between the electrodes and the operator's hands. The required insulation has been ac-electrode holders formed from an insulating material. If a heavy electrode holder is employed, the operator soon becomes fatigued, particularly when lengthy indirect welds are being made.

It is a further object of this invention to provide an improved, insulated electrode holder for a portable resistance spot welding machine.

Summary of the invention

A portable resistance spot welding machine embodying this invention comprises a lightweight cabinet which contains the welding transformer and the control mechanism for the welding transformer. A pair of electrical cables extend from the cabinet and are supported by it. One end of each of the cables is connected to the secondary winding of the welding transformer. The other end of each of the cables is electrically connected to one end of an electrode that carries a welding tip at its other end. The one end of the electrode extends into a cavity that is formed in an electrode holder. The contained portion of the electrode and the adjacent surface of the holder that defines the cavity are spaced a sufficient distance to form an insulating air gap therebetween. The cavity preferably is open at each end to the atmosphere so that a cooling air flow through the cavity may be set up by convection.

Brief description of the drawings

FIG. 1 is a perspective view of a portable resistance spot welding machine embodying this invention.

FIG. 2 is a cross-sectional view taken substantially through the longitudinal center of one of the electrode holders shown in FIG. 1.

FIG. 3 is a cross-sectional view taken across the line 3—3 of FIG. 2.

Detailed description of the preferred embodiment

Referring now in detail to the drawings, FIG. 1 illustrates a portable resistance spot welding machine comprising a sheet metal cabinet 11 that contains a welding transformer and its control aparatus. The sides of the cabinet 11 may be provided with louvers 12 so that heat generated within the cabinet 11 may be dissipated to the atmosphere. The rear portion of the cabinet 11 is supported upon wheels 13 (only one of which is shown) and the forward portion is supported upon casters 14 so that the cabinet 11 may be readily moved from place to place. A handle assembly 15 is affixed to the cabinet 11 to facilitate its movement. A lifting lug 16 is affixed to the upper surface of cabinet 11 so that the cabinet 11 may be lifted if desired.

Contained within the cabinet 11 is a welding transformer that has output terminals 17 and 18 extending through the front surface of the cabinet 11. A pair of electrical cables 19 and 21 are affixed to the transformer output terminals 17 and 18 by the connectors 22 and 23, respectively. The cables 19 and 21 are fixed relative to each other at spaced portions along their length by rubber clamps 24, 25, 26. The clamp 26 is spaced from the electrode ends of the cables 19 and 21 so that the electrodes carried thereby may be adequately manipulated to permit either direct or indirect spot welds to be made.

Referring now to FIGS. 2 and 3, an electrode support assembly, indicated generally by the reference numeral 27, is shown in cross section. A substantially similar support assembly may be positioned at the electrode ends of each of the cables 19 and 21 although in this instance slightly different support assemblies are used. The support assembly 27 is provided at the electrode end of the cable 19 and a somewhat similar support assembly is provided at the electrode end of the cable 21.

The electrode support assembly 27 is comprised of a tubular electrode holder 28 that may be formed from vulcanized fibre tube or some other material having relatively low coefficients of thermal and electrical conductivity. The holder 28 is formed with a cylindrical cavity 29 that extends completely through the holder 28 from one end to the other. A number of symmetrically spaced spacers or projections 31, extend radially from a cylindrical electrode portion 32 to the wall of the cavity 29. Preferably, at least two sets of these projections are provided along the longitudinal axis of the cavity 29. The spacers 31 may consist of generally cylindrical plugs press fit in holes drilled in the electrode portion 32. It is desirable to form them from a ceramic or synthetic material or some other material having a lower coefficient of thermal conductivity than the electrode portion 32.

The copper electrode portion 32 lies entirely in the cavity 29 and is of a diameter significantly less than the diameter of the electrode holder cavity 29 so that an annular air gap 33 is formed around the electrode portion 32. The electrode portion 32 is centered within the cavity 29 by the projections 31 to provide a uniform air gap around its circumference. The projections 31 have radially outer termini which lie on a common cylinder of a size enabling the electrode holder 28 to be slid over said termini and positioned thereon with a force fit.

The inner end of the electrode portion 32 has a longitudinally extending bore 35 formed therein. The bore 35 receives the strands 36 of the electrode end of the cable 19 from which the electrical insulation 37 has been removed. The strands 36 are clamped in the bore 35 by a pressure plate 40 that is held tight by set screws 38 and 39 threaded through tapped holes 41 and 42 formed in the electrode portion 32. Of course, other methods of securing the strands 36 in the bore 35 may also be employed. It will be apparent that the cables 19 and 21 may be secured to each of the electrode portions 32 by first inserting the electrode ends of the cables completely through the cylindrical cavity 29. Once the cables 19 and 21 are affixed to the electrodes, the electrodes may be forced axially into the electrode holders 28.

The outer ends of the electrodes are formed with a curved portion 43. The curved portion 43 terminates at a tapered hole 44 into which a tapered solid copper alloy welding tip 45 may be inserted. When the welding tips 45 are brought into engagement with the sheet metal surfaces to be welded they will complete an electrical circuit in the secondary side of the welding transformer in a manner which will become more apparent as this description proceeds. If a direct, pinch type spot weld is being made, the welding tips 45 will be brought into aligned engagement with the opposite surfaces that are to be welded. If an indirect type of weld is being made, the welding tips 45 will be positioned on the same side of one of the surfaces to be welded at spaced locations. Regardless of the type weld being made, the electrodes will become heated during the welding operation. The heat conducted to the electrode portion 32 will be dissipated by conduction and convection to the surrounding air gap 33. Convection along the axis of the cavity 29 will cause the heated air to flow through air gap 33 to provide continuous cooling. It should be readily apparent, therefore, that effective heat insulation is provided by the air space between the electrode and the electrode holder without necessitating the provision of any additional insulating material.

As has been previously noted, the support assembly 27 that is at the electrode end of the cable 19, differs slightly from the support assembly provided at the electrode end of the cable 21. The support assembly 27 includes a channel shaped sheet metal member 46 that is affixed to the electrode housing 28 by a pair of bolts 47 and 48. The member 46 and bolts 47 and 48 also support a control switch 49 having a button 51. The control switch 49 is electrically connected to the control circuit of the welding machine that is contained within the cabinet 11 by means of an electrical cable 52 and a connector 53. The switch 49 is, in effect, an on-off single pole double throw switch and controls the initiation of the weld, as will become more apparent as this description proceeds.

The duration of the weld is controlled by a variable potentiometer having a dial 54 carried by the front of the cabinet 11. A control knob 55 is provided to set the variable potentiometer. An indicator light 56 at the upper front of the cabinet 11 indicates when the welding machine is on the power line.

The apparatus thus far described may be used in connection with a control circuit of the type described in my aforenoted copending application, of which this application is a division, and reference may be had to that application for the details of the control mechanism. Generally, the duration of the weld is set by appropriately adjusting the control knob 55 of the variable potentiometer carried in the cabinet 11. A source of welding current is derived from an appropriate source of line voltage via an electrical cord 63 and appropriate plug 64. Upon the initiation of a welding cycle by depression of the button 51, the control circuit provides welding current to the electrode tips 45. Current will continue to flow, depending upon the setting of the potentiometer, until the welding time is completed whereupon the flow of current ceases. It is to be understood that other forms of welding control circuits may be used in connection with the electrode holders disclosed in this application.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. An electrode and electrode holder for a portable resistance type spot welding machine comprising an electrode holder, said electrode holder having a surface defining a longitudinally extending cavity open at each of its ends to the atmosphere, an electrode extending at least in part into said cavity, means comprising a plurality of electrical and thermal insulating elements for spacing the outer surface of said electrode from said electrode holder surface for providing an air gap therebetween and for supporting said electrode within said electrode holder, said insulating elements being spaced from each other and occupying a relatively small volume of said air gap and engaging a relatively small portion of the periphery of said electrode for precluding substantial transmission of heat from said electrode to said electrode holder, an electrical cable operatively connected to one end of said electrode for delivering welding current to said electrode, and a welding tip affixed to the other end of said electrode for engagement with a surface to be welded for delivering welding current thereto, said surface of said electrode holder that defines said cavity being spaced outwardly from the contained elements whereby cooling air may flow into said air gap and out of said air gap from the opposite ends of said electrode holder.

2. An electrode and electrode holder as set forth in claim 1 wherein the insulating elements have a substantially lower coefficient of thermal and electrical conductivity than the electrode holder.

3. An electrode and electrode holder as set forth in claim 1 wherein the cavity in the electrode holder is cylindrical and the contained portion of the electrode is cylindrical, the diameter of said cylindrical portion of said electrode being substantially less than the diameter of said cavity, certain of the insulating elements being spaced circumferentially from each other and certain of said insulating elements being spaced longitudinally from each other.

4. An electrode and electrode holder as set forth in claim 3 wherein the insulating elements comprise generally cylindrical members extending between the surface of the electrode holder and the surface of the electrode.

5. An electrode and electrode holder as set forth in claim 4 wherein ends of the insulating elements adjacent the electrode lie on a common cylinder having a lesser diameter than the diameter of the electrode surface for press fit of said electrode surface into the electrode holder.

6. An electrode and electrode holder as set forth in claim 3 in combination with a portable spot welding machine wherein two electrode holders and electrodes are provided, said portable spot welding machine comprising a mobile cabinet having control means therein, and first and second electrical cables carried at one of their ends by said cabinet, one end of each of said electrodes being affixed to a respective of said electrical cables.

7. The combination according to claim 6 further including a control switch for the welding machine carried by one of the electrode holders.

8. An electrode and electrode holder as set forth in claim 2 wherein the welding tip extends at an angle to the axis of the electrode holder cavity, the insulating elements being sufficiently rigid to preclude transverse movement of the electrode relative to the electrode holder on the application of welding pressures to said welding tip.

9. An electrode and electrode holder as set forth in claim 3 wherein the welding tip extends at an angle to the axis of the electrode holder cavity, the insulating elements being sufficiently rigid to preclude transverse movement of the electrode relative to the electrode holder on the application of welding pressures to said welding tip.

References Cited

UNITED STATES PATENTS

| 1,599,259 | 9/1926 | Welch | 219—142 |
| 2,387,169 | 10/1945 | Morford | 219—143 |
| 2,422,265 | 6/1947 | Squires. | |

FOREIGN PATENTS 801,594  9/1958  Great Britain.

JOSEPH V. TRUHE, Primary Examiner

J. G. SMITH, Assistant Examiner

U.S. Cl. X.R.

219—120, 138

PO-1050
(5/69)

UNITED STATES PATENT OFFICE
CERTIFICATE OF CORRECTION

Patent No. 3,510,623　　　　　　　　　　Dated May 5, 1970

Inventor(s) Raymond P. Wolgast

It is certified that error appears in the above-identified patent and that said Letters Patent are hereby corrected as shown below:

| Patent | Application |
|---|---|
| Column 1, line 24, | Page 1, line 6, "The" should be --This--. |
| Column 2, line 6, | Page 2, lines 22-23, before "electrode" insert --complished heretofore by the use of cumbersome, heavy--. |
| Column 2, line 46, | Page 4, line 4, "aparatus" should be --apparatus--. |
| Column 4, line 40, | Page 8, line 13, "of" should be --or--. |

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents